United States Patent
Dai et al.

(10) Patent No.: US 9,800,367 B1
(45) Date of Patent: Oct. 24, 2017

(54) ANTI-EAVESDROPPING SHELTER FOR PROTECTION OF WIRELESS COMMUNICATION

(71) Applicant: Macau University of Science and Technology, Macau (CN)

(72) Inventors: Hong-Ning Dai, Macau (CN); Xuran Li, Macau (CN); Qiu Wang, Macau (CN); Athanasios V. Vasilakos, Macau (CN)

(73) Assignee: Macau University of Science and Technology, Macau (CN)

(*) Notice: Subject to any disclaimer, the term of this patent is extended or adjusted under 35 U.S.C. 154(b) by 0 days.

(21) Appl. No.: 15/432,898

(22) Filed: Feb. 14, 2017

(51) Int. Cl.
*H04W 16/00* (2009.01)
*H04K 3/00* (2006.01)
*H04W 4/02* (2009.01)
*H04W 12/02* (2009.01)

(52) U.S. Cl.
CPC .............. *H04K 3/28* (2013.01); *H04W 4/021* (2013.01); *H04W 12/02* (2013.01); *H04W 16/00* (2013.01)

(58) Field of Classification Search
CPC ................................. H04K 3/65; H04W 16/00
USPC ........... 455/1, 445, 67.11, 411, 67.13, 456.1, 455/522, 69
See application file for complete search history.

(56) References Cited

U.S. PATENT DOCUMENTS

| | | | | |
|---|---|---|---|---|
| 2013/0029589 | A1* | 1/2013 | Bontu | H04W 16/14 455/7 |
| 2013/0281005 | A1* | 10/2013 | Causey | H04K 3/65 455/1 |
| 2014/0004865 | A1* | 1/2014 | Bhargava | H04W 74/0816 455/445 |

OTHER PUBLICATIONS

Y. Zou, J. Zhu, X. Wang, and L. Hanzo, "A survey on wireless security: Technical challenges, recent advances, and future trends," Proceedings of the IEEE, vol. 104, No. 9, pp. 1727-1765, 2016.
R. Verdult, F. D. Garcia, and J. Balasch, "Gone in 360 seconds: Hijacking with hitag2," in Presented as part of the 21st USENIX Security Symposium (USENIX Security 12), 2012, pp. 237-252.
H. Hassanieh, J. Wang, D. Katabi, and T. Kohno, "Securing rfids by randomizing the modulation and channel," in 12th USENIX Symposium on Networked Systems Design and Implementation (NSDI 15), May 2015.
A. Mukheriee, S. A. A. Fakoorian, J. Huang, and A. L. Swindlehurst, "Principles of physical layer security in multiuser wireless networks: A survey," IEEE Communications Surveys and Tutorials, vol. 16, No. 3, pp. 1550-1573, 2014.
N. Zhang, N. Cheng, N. Lu, X. Zhang, J. W. Mark, and X. . Shen, "Partner selection and incentive mechanism for physical layer security," IEEE Transactions on Wireless Communications, vol. 14, No. 8, pp. 4265-4276, 2015.

(Continued)

*Primary Examiner* — John J Lee
(74) *Attorney, Agent, or Firm* — Eagle IP Limited; Jacqueline C. Lui

(57) ABSTRACT

A method improves an anti-eavesdropping (AE)-shelter that emits interference signals that protect communication (Continued)

between legitimate transmitters and legitimate receivers in the AE-shelter. The method includes determining a circular boundary for the AE-shelter; improving the AE-shelter by uniformly placing a number of jammers at the boundary; tuning emitting power of the jammers; and improving a coverage area of the interference signals.

20 Claims, 13 Drawing Sheets

(56) References Cited

OTHER PUBLICATIONS

Y. Zou, J. Zhu, L. Yang, Y. Liang, and Y. Yao, "Securing physical-layer communications for cognitive radio networks," IEEE Communications Magazine, vol. 53, No. 9, pp. 48-54, 2015.

K. R. B. Z. W. Wang, Z. Sun and S. Piao, "Wireless physical-layer identification: Modeling and validation," IEEE Transactions on Information Forensics and Security, 2016.

K. Ren, H. Su, and Q. Wang, "Secret key generation exploiting channel characteristics in wireless communications," IEEE Wireless Communications, vol. 18, No. 4, pp. 6-12, 2011.

M. Zafer, D. Agrawal, and M. Srivatsa, "Limitations of Generating a Secret Key Using Wireless Fading Under Active Adversary," IEEE/ACM Transactions on Networking, vol. 20, No. 5, pp. 1440-1451, 2012.

K. Zeng, "Physical layer key generation in wireless networks: challenges and opportunities," IEEE Communications Magazine, vol. 53, No. 6, pp. 33-39, Jun. 2015.

M. Edman, A. Kiayias, Q. Tang, and B. Yener, "On the security of key extraction from measuring physical quantities," IEEE Transactions on Information Forensics and Security, vol. 11, No. 8, pp. 1796-1806, 2016.

J. P. Vilela, M. Bloch, J. Barros, and S. W. McLaughlin, "Wireless secrecy regions with friendly jamming," IEEE Transactions on Information Forensics and Security, vol. 6, No. 2, pp. 256-266, 2011.

S. Sankararaman, K. Abu-Affash, A. Efrat, S. D. Eriksson-Bique, V. Polishchuk, S. Ramasubramanian, and M. Segal, "Optimization schemes for protective jamming," in Proceedings of ACM MOBIHOC, 2012.

Y. S. Kim, P. Tague, H. Lee, and H. Kim, "A jamming approach to enhance enterprise wi-fi secrecy through spatial access control," Wirel. Netw., pp. 2631-2647, Nov. 2015.

X. Li, H.-N. Dai, and H. Wang, "Friendly-Jamming: An Anti-Eavesdropping Scheme in Wireless Nets of Things," in IEEE Global Communications Conference (Globecom), Washington D.C., USA, 2016.

J. A. MacDougall and R. H. Buchholz, "Cyclic polygons with rational sides and area," Journal of Number Theory, vol. 128 (1), pp. 17-48, 2008.

H. ElSawy, E. Hossain, and M. Haenggi, "Stochastic geometry for modeling, analysis, and design of multi-tier and cognitive cellular wireless networks: A survey," IEEE Communications Surveys Tutorials, vol. 15, No. 3, pp. 996-1019, Third 2013.

M. Evans, N. Hastings, and B. Peacock, Statistical Distributions, 3rd ed. New York: Wiley, 2000.

M. C. Valenti, D. Tonieri, and S. Talarico, "A direct approach to computing spatially averaged outage probability," IEEE Communications Letters, vol. 18, pp. 1103-1106, 2014.

Z. Khalid and S. Durrani, "Distance distributions in regular polygons," IEEE Trans. Veh. Technol., vol. 62, pp. 2363-2368, 2013.

[21] G. E. Andrews, R. Askey, and R. Roy, Encyclopedia of Mathematics and its Applications. Cambridge University Press, 1999.

J.-C. Kao and R. Marculescu, "Minimizing Eavesdropping Risk by Transmission Power Control in Multihop Wireless Networks," IEEE Transactions on Computers, vol. 56, pp. 1009-1023, 2007.

J. G. Andrews, F. Baccelli, and R. K. Ganti, "A tractable approach to coverage and rate in cellular networks," IEEE Transactions on Communications, pp. 3122-3134, Nov. 2011.

\* cited by examiner

*m* is even

*m* is odd

500 ⤵

---

Algorithm 1 Calculate $S$

1: $m \leftarrow 0, I_j^e \leftarrow 0$;

2: Calculate $d_c = \left[ \dfrac{P_t}{\mu(\sigma^2)T_c} \right]^{1/\alpha}$ ; {according to Eq. (7)}

3: while $m < \left\lfloor \arccos\left( \dfrac{R^2 + L^2 - d_c^2}{2RL} \right) / \theta \right\rfloor$ ; {according to Eq. (5)} do

4: $\quad m \leftarrow m + 1$;

5: $\quad$ Calculate with m; {according to two cases of $m$}

6: $\quad$ Calculate $d_c = \left[ \dfrac{P_t}{\mu(\sigma^2 + I_j^e)T_c} \right]^{1/\alpha}$ ; {according to Eq. (5)}

7: end while

8: Calculate $S$ ;{according to Eq. (5)}

9: return $S$ ;

$$\alpha = 4, P_t = 1$$

$$\alpha = 3, P_t = 2$$

ANTI-EAVESDROPPING SHELTER FOR PROTECTION OF WIRELESS COMMUNICATION

FIELD OF THE INVENTION

The present invention relates to methods and apparatus that improve anti-eavesdropping (AE) configurations of friendly jammers that mitigates eavesdropping attacks in wireless networks.

BACKGROUND

Wireless networks are vulnerable to eavesdropping attacks due to the broadcast nature of wireless medium. Encryption protocols that are implemented to protect the confidential communications may not be feasible for all types of wireless networks due to hardware constraints. Physical-layer security schemes are resource intensive. Conventional jamming schemes using protective jammers can only be applied to specific scenarios. Methods and apparatus that assist in advancing technological needs and industrial applications in jamming schemes are desirable.

SUMMARY OF THE INVENTION

One example embodiment is an improved anti-eavesdropping (AE) scheme or improved AE-shelter that generates wireless interference signals that protect wireless communication between legitimate transmitters and legitimate receivers within the improved AE-shelter.

In one example embodiments, a method improves an AE-shelter that emits wireless interference signals that protect wireless communication between legitimate transmitters and legitimate receivers within the AE-shelter. The method includes determining a circular boundary for the AE-shelter; improving the AE-shelter by uniformly placing a number of jammers at the circular boundary with a jamming range $r_j$ for each jammer; tuning emitting power $R_J$ of the jammers so that power of the interference signal at distance $r_j$ from the jammers is not lower than a predetermined threshold $T_j$ to enable jamming of the wireless communication; and improving a coverage area of the wireless interference signals such that the jamming range of one jammer does not overlap with the jamming range of another jammer and such that the jamming range of all of the jammers covers an entirety of the circular boundary.

Other example embodiments are discussed herein.

BRIEF DESCRIPTION OF THE DRAWINGS

FIG. 5 shows a pseudo code that outlines the algorithm for solving the area of eavesdropping region S in accordance with an example embodiment.

DETAILED DESCRIPTION

Figure 1:
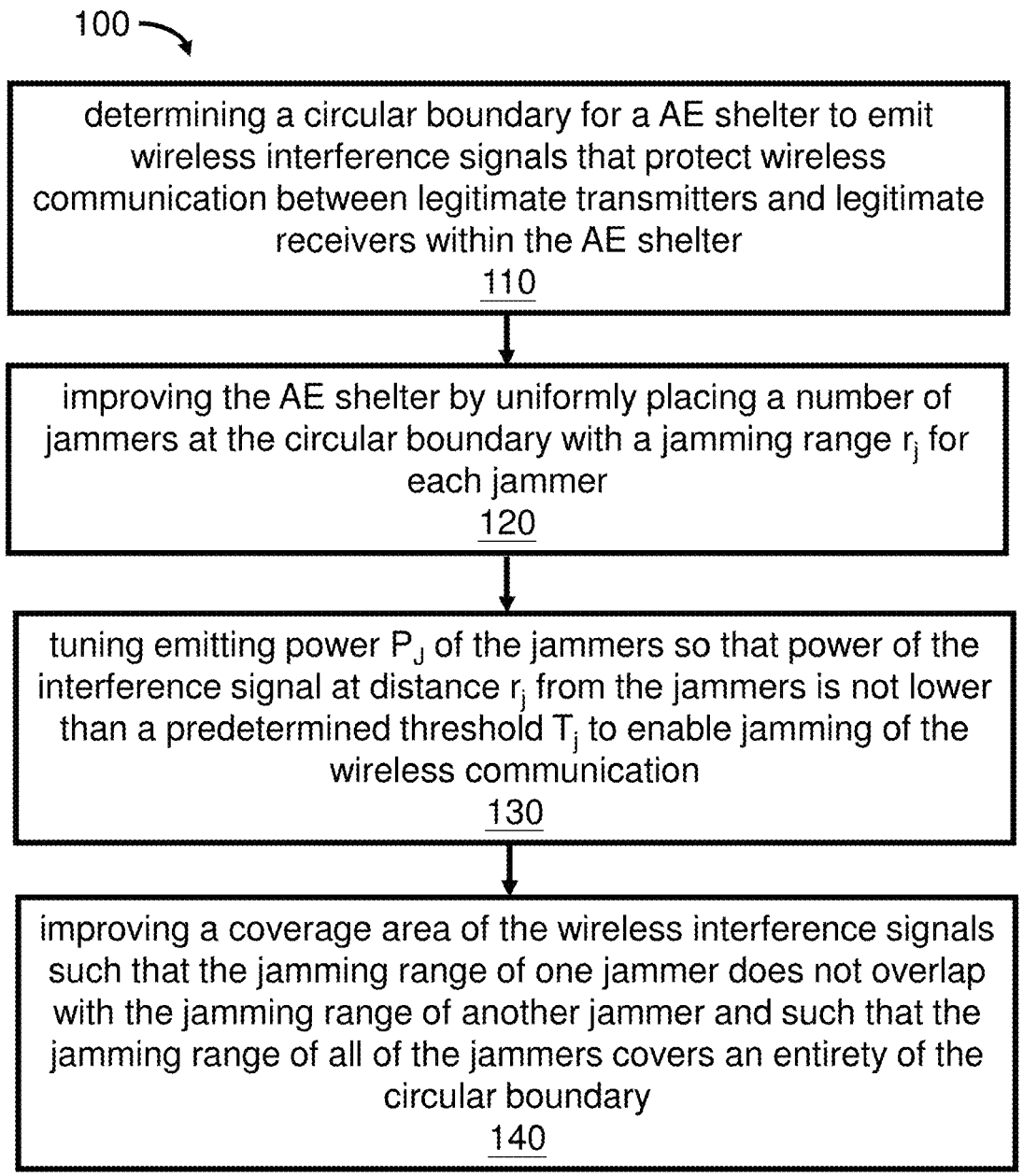
FIG. 1 shows a method that improves an AE-shelter that emits wireless interference signals that protect wireless communication within the AE-shelter in accordance with an example embodiment.

Example embodiments relate to methods and apparatus that improve anti-eavesdropping (AE) configurations that protect legitimate communications from eavesdropping. The improved AE configuration places multiple jammers at a circular boundary around the protected area where legitimate and secure communications can take place. The jammers emit jamming signals to prevent eavesdroppers from wiretapping confidential information.

An example embodiment includes a method that improves an AE-shelter that emits wireless interference signals that protect wireless communication between legitimate transmitters and legitimate receivers within the AE-shelter. A number of jammers are uniformly or evenly spaced apart around or along a circular boundary. This spacing improves a coverage area of the wireless interference signals such that the jamming range of one jammer does not overlap with the jamming range of another jammer and such that the jamming range of all of the jammers covers an entirety of the circular boundary. The jammer sending artificial noise can mitigate the eavesdropping capability of wiretapping the confidential information. As such, the configuration of the jammers reduces the overall number of jammers required for a given geographical area without compromising the effectiveness of protecting legitimate communications within the AE-shelter.

In one example embodiment, an improved AE-shelter generates wireless interference signals to protect wireless communication between legitimate transmitters and legitimate receivers. The shelter includes an improved geometrical structure including a circular boundary and a number of jammers that are constructed with wireless interference signals generators to generate the wireless interference signals. The circular boundary surrounds the legitimate transmitters and the legitimate receivers, and the jammers are uniformly located or evenly spaced apart at the circular boundary with jamming range $r_j$ for each jammer. This configuration provides an improved coverage area of the wireless interference signals including a non-overlapped jamming range of the jammers that covers an entirety of the circular boundary. A power control unit electrically connects to the jammers and tunes emitting power $P_j$ of the jammers so that power of the wireless interference signals at distance $r_j$ from the jammers is not lower than a predetermined threshold $T_j$ to enable jamming of the communication. The configuration thus optimizes the size and shape of the jamming area in addition to reducing a number of jammers necessary to generate the AE-shelter.

Encryption schemes that are implemented at the upper layers of the network stack are typically used to protect the confidential communications in wireless networks. However, the encryption protocols may not be feasible for all types of wireless networks due to hardware constraints such as the inferior computational capability and the limited power of wireless nodes. For example, it is shown in that one of light-weight encryption schemes used in RFID-based anti-theft devices for cars can be broken less than 6 minutes. The security can be enhanced by using more sophisticated ciphers, which nonetheless are impractical to wireless sensor networks (WSNs) or Internet of Things (IoT) since they are often computational intensive and power-consuming, inevitably increasing the cost and the size of nodes (or tags).

Compared with encryption schemes implemented at the upper layers of the network protocol stack, physical-layer security schemes can potentially enhance the network security while maintaining relatively lower cost. There is a substantial body of studies on designing encryption algorithms by exploiting inherent channel randomness characteristics between the transmitter and the receiver. However, the schemes are still resource intensive, i.e. intensive computing and high power consuming and cannot be used to the resource-constrained wireless networks such as WSNs or IoT.

Protective jamming techniques in accordance with example embodiments aim at reducing the eavesdropping capability of wiretapping the confidential information without significant increment of the resource consumption. Further, example embodiments do not have the drawbacks of conventional schemes. For example, many conventional schemes can only be applied to specific scenarios. For example, jamming schemes limit the number of jammers to at most two jammers, make an assumption that Gaussian channel is used, only be used in Wireless Local Area Networks (WLANs), or mainly target for IoT. There is a lack of protective jamming schemes that can be applied to various scenarios, such as jamming schemes in accordance with example embodiments.

FIG. 1 shows a method according to an example embodiment that improves an AE-shelter to emit wireless interference signals that protect wireless communication between legitimate transmitters and legitimate receivers within the AE-shelter.

Block 110 illustrates determining a circular boundary for the AE-shelter.

Block 120 illustrates improving the AE-shelter by uniformly placing a number of jammers at the circular boundary with a jamming range $r_j$ for each jammer.

Block 130 illustrates tuning emitting power $P_j$ of the jammers so that power of the interference signal at distance $r_j$ from the jammers is not lower than a predetermined threshold $T_j$ to enable jamming of the wireless communication.

Block 140 illustrates improving a coverage area of the wireless interference signals such that the jamming range of one jammer does not overlap with the jamming range of another jammer and such that the jamming range of all of the jammers covers an entirety of the circular boundary.

The improved AE-shelter in one example embodiment is less resource-intensive (e.g., no extensive computing resource needed) when compared to conventional jamming schemes. The improved AE-shelter does not require any modifications on existing network infrastructure or wireless nodes. Also, the improved AE-shelter is jamming-efficient. In particular, given the same number of jammers as other existing jamming schemes, the improved AE-shelter has the larger anti-eavesdropping area than other existing jamming schemes. This is because the circle has the largest coverage area with the given circumference compared with other shapes, given that jammers are uniformly distributed at the circle. Moreover, the improved AE-shelter is general that can be used in various scenarios. This is due to the fact that the protected area in any shapes can be fully contained within a circle. The improved AE-shelter can be integrated with other security schemes to further improve the system security.

Figure 2:
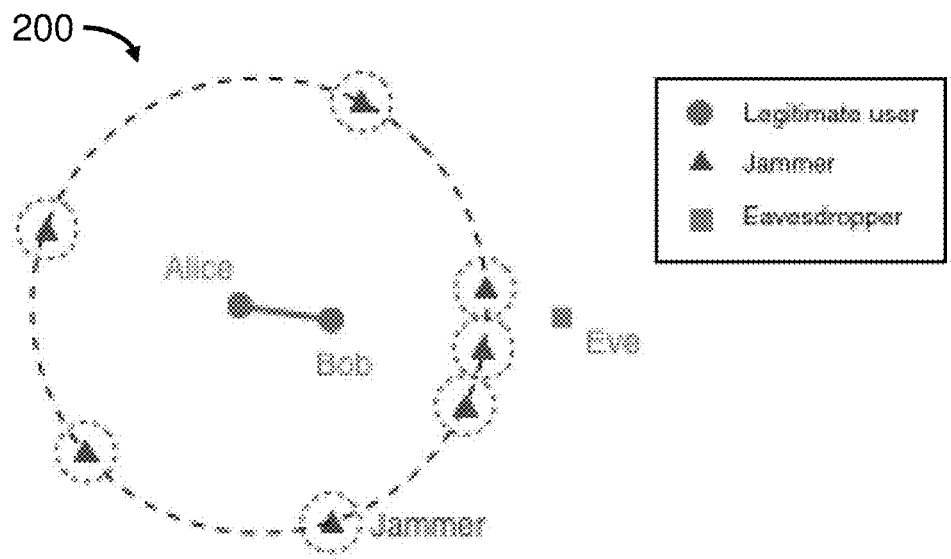
FIG. 2 shows an improved AE-shelter in a scenario in accordance with an example embodiment.

FIG. 2 shows a scenario 200 in one example embodiment that source node Alice is transmitting confidential data to a destination Bob while a malicious eavesdropper Eve is attempting to wiretap the transmission between Alice and Bob. In the improved AE-shelter, N jammers that are sending artificial noise signals are uniformly distributed at the border of the circle, which provides a virtual shelter to protect the confidential communication between Alice and Bob.

Figure 3:
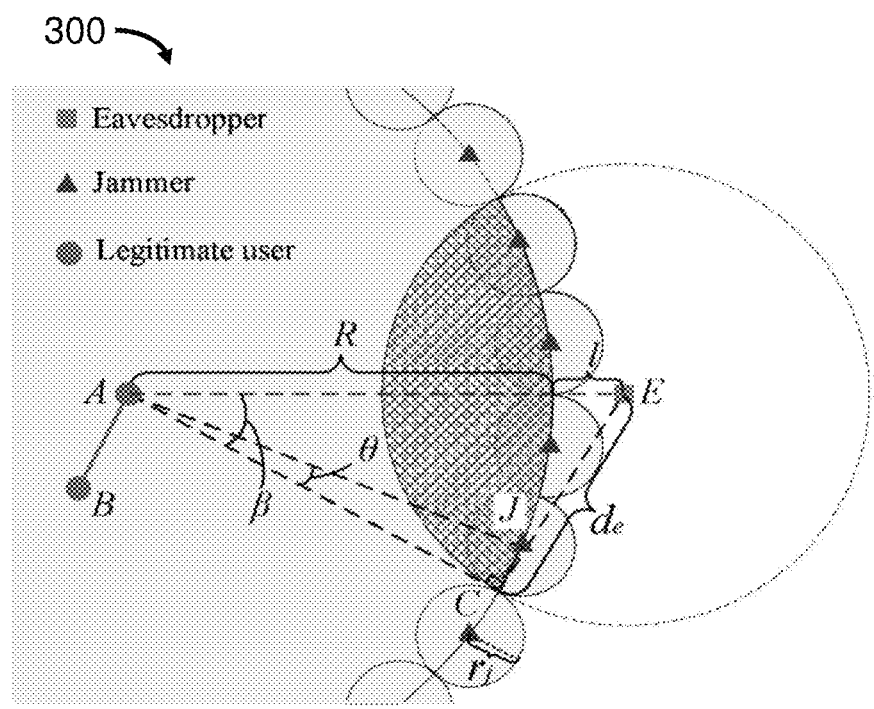
FIG. 3 shows an improved AE-shelter in a scenario in accordance with an example embodiment.

FIG. 3 illustrates a scenario 300 in one example embodiment where the improved AE-shelter can establish a virtual fence preventing malicious eavesdropping attacks. In particular, the circular shelter has radius of R, in which legitimate users are randomly distributed according to homogeneous Poisson point process (PPP) with density $\lambda$. There is an eavesdropper E who is 1 away from the border of the shelter and is trying to wiretap the confidential communications within the shelter.

The eavesdropper can successfully wiretap the legitimate communications if and only if the legitimate transmitters fall in the eavesdropper's eavesdropping region, which is essentially the intersection of the large circle with radius R and the small circle with radius $d_e$ (i.e. the dark shade region). The radius $d_e$ of the small circle is defined as the eavesdropping range of the eavesdropper. A number of protective jammers are uniformly deployed at the boundary of the shelter. The protective jammers emit artificial noise to prevent eavesdroppers from wiretapping confidential information. In this manner, the eavesdropping risk will be minimize.

A radio channel model is defined based on radio channel mainly affected by Rayleigh fading and path loss. Let $P_t$ be the transmitting power of legitimate transmitters. Then, the received power at a distance r from a transmitter is $P_t \cdot h \cdot r^{-\alpha}$, where the random variable h follows an exponential distribution with mean $1/\mu$ and it can be approximated by $\exp(\mu)$ where $\mu$ is Rayleigh fading factor and $\alpha$ is the path loss factor.

One can deploy as many jammers as possible. However, this is not cost-effective and can also cause the interference to legitimate communications. It is essentially tight to deploy jammers with consideration of two constraints: i) the distribution of jammers should be uniform so that an omni-bearing protection can be offered since there is no pre-knowledge of the eavesdropper's location; ii) any two adjacent jammers should be separated in a large enough space to ensure the cost-effectiveness. In particular, the jamming range of each jammer is denoted by $r_j$ as shown in FIG. 3. The jamming region (i.e. the circle with radius $r_j$, as shown in FIG. 3) of each jammer does not overlap with those of its adjacent neighbors. Without loss of generality, it is assumed each jammer has the same setting. In yet another example embodiment, the jammers can be distributed in a looser manner at the boundary of the shelter. For example, the jammers are deployed in a way avoiding obstacles. Thus, the upper bound on the number of jammers can be derived based on this tight placement. The maximum number of jammers depends on the size of the shelter and the size of the jamming region. In practice, the size of the shelter should be far greater than the size of the jamming region. Therefore, the maximum number of jammers denoted by N is bounded by $$\left\lceil \frac{2\pi}{2\theta} \right\rceil = \left\lceil \frac{\pi}{\theta} \right\rceil.$$

According to the triangular relation of the $\triangle ACJ$ as shown in FIG. 3, the angle $\theta$ is obtained as follows, $$\theta = \arcsin\left(\frac{|CJ|}{R}\right) \quad (1)$$

where $|CJ|$ is equal to the expectation of $r_j$ denoted by $E(r_j)$.

The jamming range $r_j$ is derived as follows. According to the radio channel model, the received power at a distance r from a jammer is $P_j \cdot h \cdot r^{-\alpha}$, where $P_j$ is the emitting power of a jammer. $P_j$ is carefully tuned so that the receiving power at distance r is no lower than a threshold $T_j$. Thus, $$P_j \cdot h \cdot r^{-\alpha} \geq T_j \quad (2)$$

Inequality (2) can be represented as, $$r \leq \left(\frac{P_J \cdot h}{T_j}\right)^{\frac{1}{\alpha}} \quad (3)$$

The right-hand-side (RHS) of Inequality (3) is defined as, $$r_j = \left(\frac{P_J \cdot h}{T_j}\right)^{1/\alpha}$$

which is a random variable since h is a random variable.

The expectation of $r_j$ is then derived as follows, $$E(r_j) = E\left[\left(\frac{P_J \cdot h}{T_j}\right)^{\frac{1}{\alpha}}\right] = \frac{1}{\alpha} \cdot \left(\frac{P_J}{\mu T_j}\right)^{\frac{1}{\alpha}} \cdot \Gamma\left(\frac{1}{\alpha}\right) \quad (4)$$

where $E(\bullet)$ denotes the expectation and $\Gamma(\bullet)$ denotes the standard gamma function.

The eavesdropping probability, which is denoted by $P_E$, is introduced to measure the eavesdropping risk. $P_E$ is defined as the probability that at least one transmission has been wiretapped by an eavesdropper. According to the definition of the eavesdropping probability, $$P_E = 1 - P(Y=0)$$

where Y is a random variable representing the number of transmitters wiretapped by an eavesdropper. Since legitimate transmitters are randomly distributed according to PPP with density $\lambda$, thus $P(Y=0) = e^{-\lambda \cdot S}$, where S represents the area of the eavesdropping region.

As shown in FIG. 3, the area of eavesdropping region S can be calculated according to the circle-circle intersection. In particular, $$S = \left[R^2 \arccos\frac{x}{R} - x\sqrt{R^2 - x^2}\right] + \left[d_e^2 \arccos\frac{L-x}{d_e} - (L=x)\sqrt{d_e^2 - (L-x)^2}\right] \quad (5)$$

where $L=R+l$ is represented for simplicity, $$x = \frac{L^2 - d_e^2 + R^2}{2L}$$

and $d_e$ denotes the eavesdropping range. As shown in FIG. 3, $d_e$ is the radius of the eavesdropping region.

An eavesdropper can successfully decode the information from transmitters if and only if the signal-to-interference-noise ratio (SINR) of the eavesdropper, denoted by $SINR_e$, is no less than a given threshold $T_e$. In other words, the following condition is satisfied, $$SINR_e = \frac{P_t \cdot h \cdot r^{-\alpha}}{\sigma^2 + I_j^e} \geq T_e \quad (6)$$

where $P_t$ denotes the transmitting power, $\sigma^2$ denotes the Gaussian noise level, and $I_j^e$ is the cumulative interference from all the jammers to the eavesdropper.

Let LHS be equal to RHS in Eq. (6). The eavesdropping range $d_e$ (i.e., the maximum eavesdropping distance) is as follow, $$d_e = E\left[\frac{hP_t}{(\sigma^2 + I_j^e)T_e}\right]^{1/\alpha} = \left[\frac{P_t}{\mu(\sigma^2 + I_j^e)T_e}\right]^{1/\alpha} \quad (7)$$

To simplify the analysis, the interference from the jammers outside the eavesdropping region is assumed to be negligible since they are far from the eavesdropper and have less impacts on the eavesdropper. The number of jammers falling into the eavesdropping region, denoted by m, is bounded by $$\left\lceil \frac{\beta}{\theta} \right\rceil = \left\lceil \arccos\left(\frac{R^2 + L^2 - d_e^2}{2RL}\right) / \theta \right\rceil \qquad (8)$$

where β is calculated according to the triangular relation of the ΔACE as shown in FIG. 3 and L=R+l.

Figure 4A:
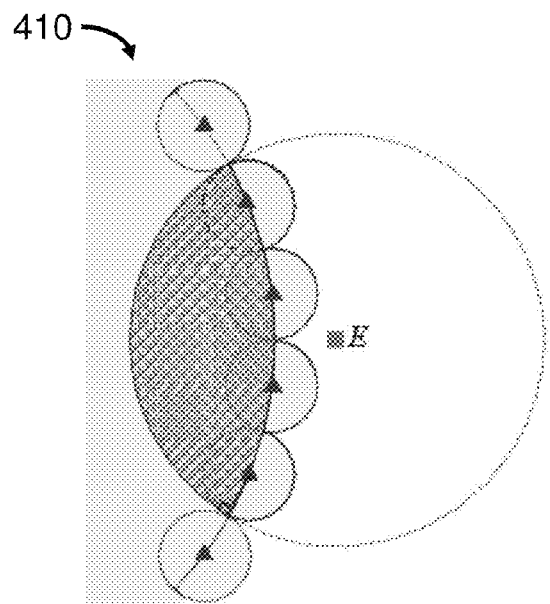
FIG. 4A shows an improved AE-shelter in a scenario in which m is even in accordance with an example embodiment.

For m, which is the number of jammers falling into the eavesdropping region, is even as illustrated in FIG. 4A, the distance between each jammer and the eavesdropper is defined as $r_j(n)$, where n=1, 2, . . . , m/2 (only a half of m due to the symmetry). Then, $$r_j(1) = \sqrt{L^2 + R^2 - 2LR\left(\beta - \arcsin\frac{r_j}{R}\right)},$$

$$r_j(2) = \sqrt{L^2 + R^2 - 2LR\left(\beta - 3\arcsin\frac{r_j}{R}\right)},$$

. . . , $$r_j\left(\frac{m}{2}\right) = \sqrt{L^2 + R^2 - 2LR\left[\beta - (m-1)\arcsin\left(\frac{r_j}{R}\right)\right]}.$$

The interference from jammers to the eavesdropper can be expressed as follows, $$I_j^e = 2 \cdot \frac{P_j}{\mu} \sum_{n=1}^{\frac{m}{2}} (r_j(n))^{-\alpha} = \qquad (9)$$

$$\frac{2P_j}{\mu} \sum_{n=1}^{\frac{m}{2}} \left[\sqrt{L^2 + R^2 - 2LR\left[\beta - (2n-1)\arcsin\left(\frac{r_j}{R}\right)\right]}\right]^{-\alpha}$$

Figure 4B:
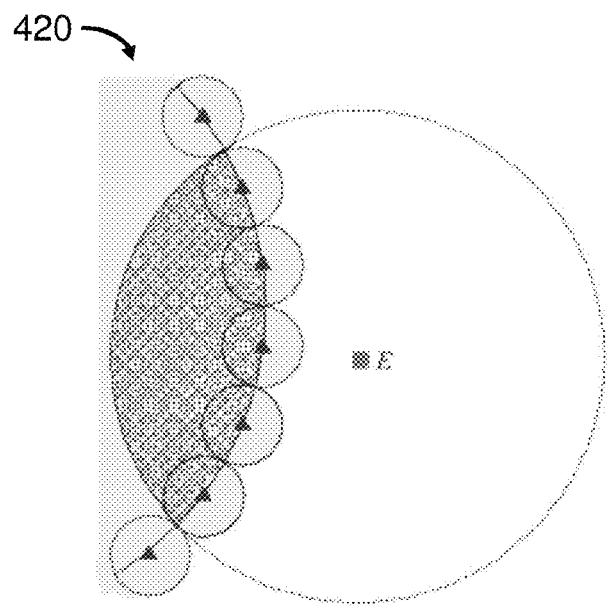
FIG. 4B shows an improved AE-shelter in a scenario in which m is odd in accordance with an example embodiment.

For m is odd as illustrated in FIG. 4B, the distance between each jammer and the eavesdropper can be expressed as follows, $$r_j(1) = \sqrt{L^2 + R^2 - 2LR\left(\beta - \arcsin\left(\frac{r_j}{R}\right)\right)}$$

$$r_j(2) = \sqrt{L^2 + R^2 - 2LR\left(\beta - 3\arcsin\left(\frac{r_j}{R}\right)\right)}$$

. . . , $$r_j\left(\frac{m-1}{2}\right) = \sqrt{L^2 + R^2 - 2LR\left[\beta - (m-2)\arcsin\left(\frac{r_j}{R}\right)\right]}$$

$$r_j\left(\frac{m+1}{2}\right) = \sqrt{L^2 + R^2 - 2LR\left(\beta - m\arcsin\left(\frac{r_j}{R}\right)\right)}$$

Then the interference from jammers to the eavesdropper is given by, $$I_j^e = \frac{2P_j}{\mu} \sum_{n=1}^{\frac{m-1}{2}} (r_j(n))^{-\alpha} + \frac{P_j}{\mu}\left(r_j\left(\frac{m+1}{2}\right)\right)^{-\alpha} \qquad (10)$$

$$= \frac{2P_j}{\mu} \sum_{n=1}^{\frac{m-1}{2}} \left\{\sqrt{L^2 + R^2 - 2LR\left[\beta - (2n-1)\arcsin\left(\frac{r_j}{R}\right)\right]}\right\}^{-\alpha} +$$

$$\frac{P_j}{\mu}\left(r_j\left(\frac{m+1}{2}\right)\right)^{-\alpha}$$

More specifically, when m=1, $$I_j^e = P_j(r_j(1))^{-\alpha}.4$$

It is shown in the above analysis that m, $d_e$ and S are co-related with each other. Thus, S cannot be obtained directly. To solve S, algorithm 1 is developed and FIG. 5 shows the pseudo code 500 that outlines the algorithm 1.

The transmission probability, which is denoted by $P_C$, is introduced to measure the impacts of the improved AE-shelter in one example embodiment on the legitimate communications. $P_C$ is defined as the probability that a legitimate transmitter can successfully transmit with another legitimate receiver.

To ensure the legitimate transmission, it is required that SINR at the legitimate receiver denoted by $SINR_C$ must be no less than $T_C$, which is the threshold of the receiving power for a successful reception. Thus, $$P_C(r) = P[SINR_c \geq T_c | r] = P\left[\frac{P_t \cdot h_0 \cdot r^{-\alpha}}{\sigma^2 + I_t + I_j^c} \geq T_C \bigg| r\right] \qquad (11)$$

Where $$I_t = \sum_{i=1}^{M} P_t h_i r_j^{-\alpha}$$

is the cumulative interference from M legitimate transmitters and $$I_j^c = \sum_{i=1}^{N} P_j h_k R^{-\alpha}$$

is the cumulative interference from N jammers to the reference receiver.

According to the exponential distribution formed by Rayleigh factor h and the property that the sums of independent exponential random variables follows Erlang distribution, $$I_j^c = E\left[P_j R^{-\alpha} \sum_{t=1}^{N} h_t\right] = P_j R^{-\alpha} \int_0^\infty \frac{(\mu x)^N e^{-\mu x}}{(N-1)!} dx \qquad (12)$$

the transmission probability $P_C(r)$ as follows, $$P_C(r) = \exp\left[-T_c\left(\frac{\sigma^2}{P_t r_0^{-\alpha}} + I_j^c\right)\right] \cdot \prod_{i=1}^{M} \frac{r_i^\alpha}{T_c + r_i^\alpha} \qquad (13)$$

Let $P_C^M$ be the averaged transmission probability in the shelter with M transmitters, which can be calculated as follows, $$P_C^M = \int_0^R PC(r) f_r(r|M) dr \quad (14)$$

$$= \exp\left[-T_c\left(\frac{\sigma^2}{P_t r_0^\alpha} + I_j^c\right)\right] \cdot \left(\int_0^R f_r(r) \frac{r_i^\alpha}{T_c + r_i^\alpha} dr\right)^M$$

Since the distance distribution can be expressed as $$f_r(r) = \frac{2\pi r}{\pi R^2} = \frac{2r}{R^2}$$

as the receiver is located at the center of the shelter, $P_C^M$ is expressed as follows, $$P_C^M = \exp\left[-T_c\left(\frac{\sigma^2}{P_t r_0^\alpha} + I_j^c\right)\right] \cdot \left(\frac{2}{R^2}\int_0^R \frac{r_i^{1+\alpha}}{T_c + r_i^\alpha} dr\right)^M \quad (15)$$

$$= \exp\left[-T_c\left(\frac{\sigma^2}{P_t r_0^\alpha} + I_j^c\right)\right] \cdot$$

$$\left(\frac{2R^\alpha}{2+\alpha} \cdot {}_2F_1\left(1, 1+\frac{2}{\alpha}, 2+\frac{2}{\alpha}, -\frac{R^\alpha}{T_c}\right)\right)^M$$

where ${}_2F_1$ is the Gauss hypergeometric function, which is given by $${}_2F_1(a, b, c, d) = \frac{\Gamma(c)}{\Gamma(b)\Gamma(c-b)} \times \int_0^1 u^{b-1}(1-u)^{c-b-1}(1-du)^{-a} du$$

Finally, the transmission probability $P_C$ is as follows, $$P_C = \sum_{M=0}^{\infty} P_C^M \cdot p(M) \quad (16)$$

where p(M) is the probability mass function of M as defined in in this equation:

$$p(M) = \frac{(\lambda \pi R^2)^M}{M!} e^{-\lambda \pi R^2}$$

Thus, a model to analyze the eavesdropping risk and transmission probability based on stochastic geometry is established and the effectiveness of the improved AE-shelter in one example embodiment can be evaluated based on the eavesdropping risk and the transmission probability. The following common parameters are chosen when conducting numerical evaluations: i) the radius of the shelter is R=2; ii) the distance between the eavesdropper and the shelter l=1; iii) the noise signal power $\sigma^2$=0.01; iv) the Rayleigh fading factor $\mu$=1; v) the transmitting power of jammers $P_j$=0.5; vi) the power attenuation threshold of jammers $T_j$=0 dB; vii) the SINR threshold of the legitimate receiver and the SINR threshold of the eavesdropper are $T_c$=5 dB and $T_e$=5 dB, respectively. Besides, the density of legitimate users $\lambda$ varies from 0.01 to 0.3 and the path loss factor $\alpha$ is ranging from 3 to 4.

Figure 6A:
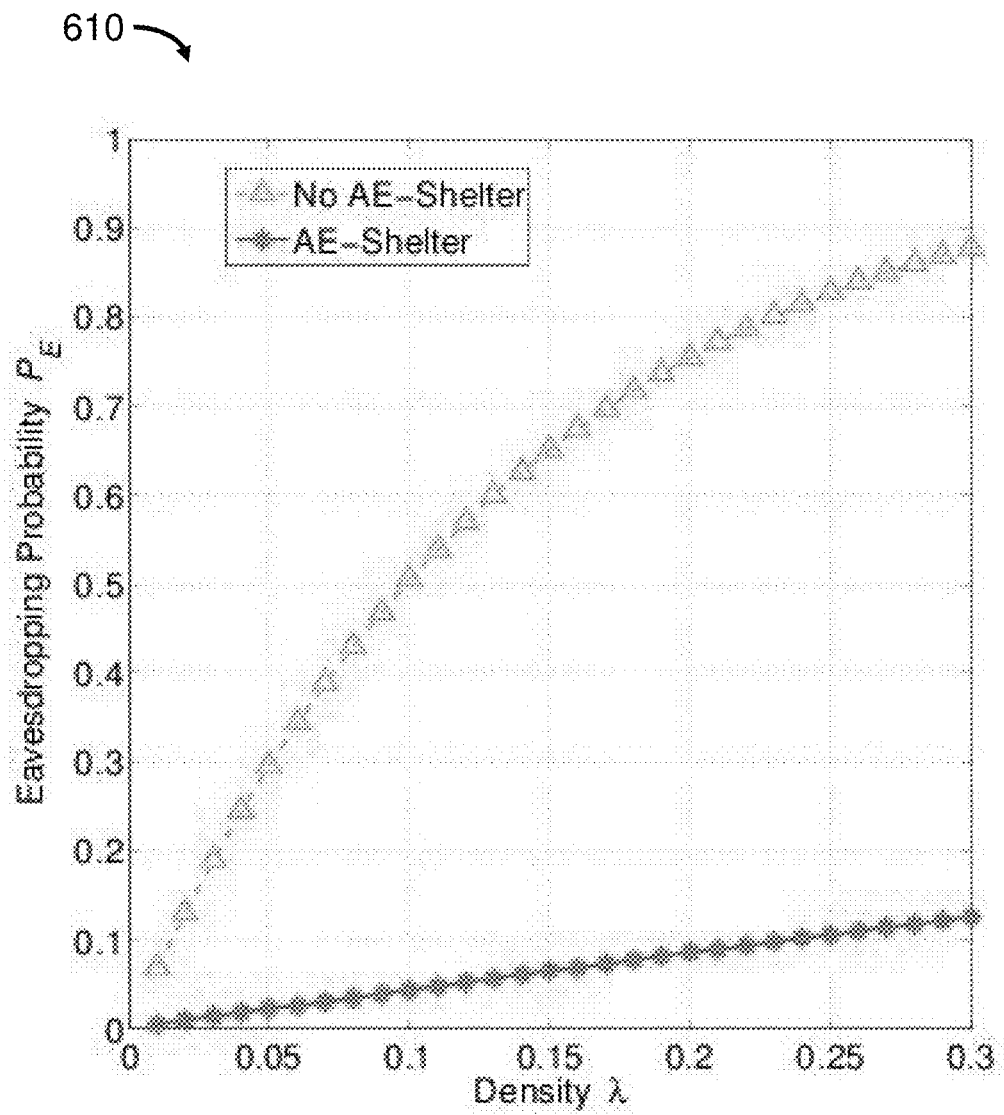
FIG. 6A shows the eavesdropping probability $P_E$ varies with the density of transmitters $\lambda$ when the path loss factor $\alpha$ is 3 and the transmitting power $P_t$ is 1 in No AE-shelter scheme and AE-shelter scheme in accordance with an example embodiment.
Figure 6B:
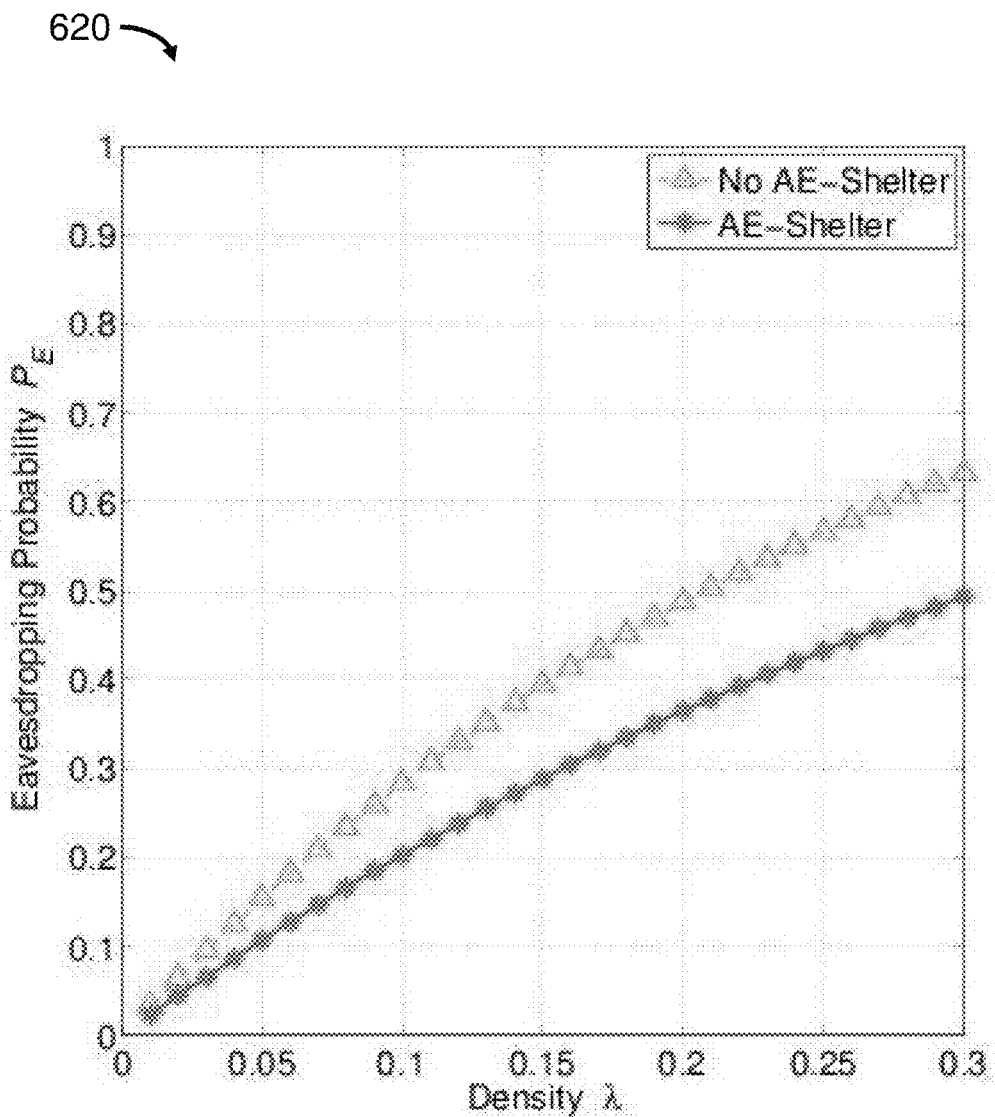
FIG. 6B shows the eavesdropping probability $P_E$ varies with the density of transmitters $\lambda$ when the path loss factor $\alpha$ is 4 and the transmitting power $P_t$ is 1 in No AE-shelter scheme and AE-shelter scheme in accordance with an example embodiment.
Figure 6C:
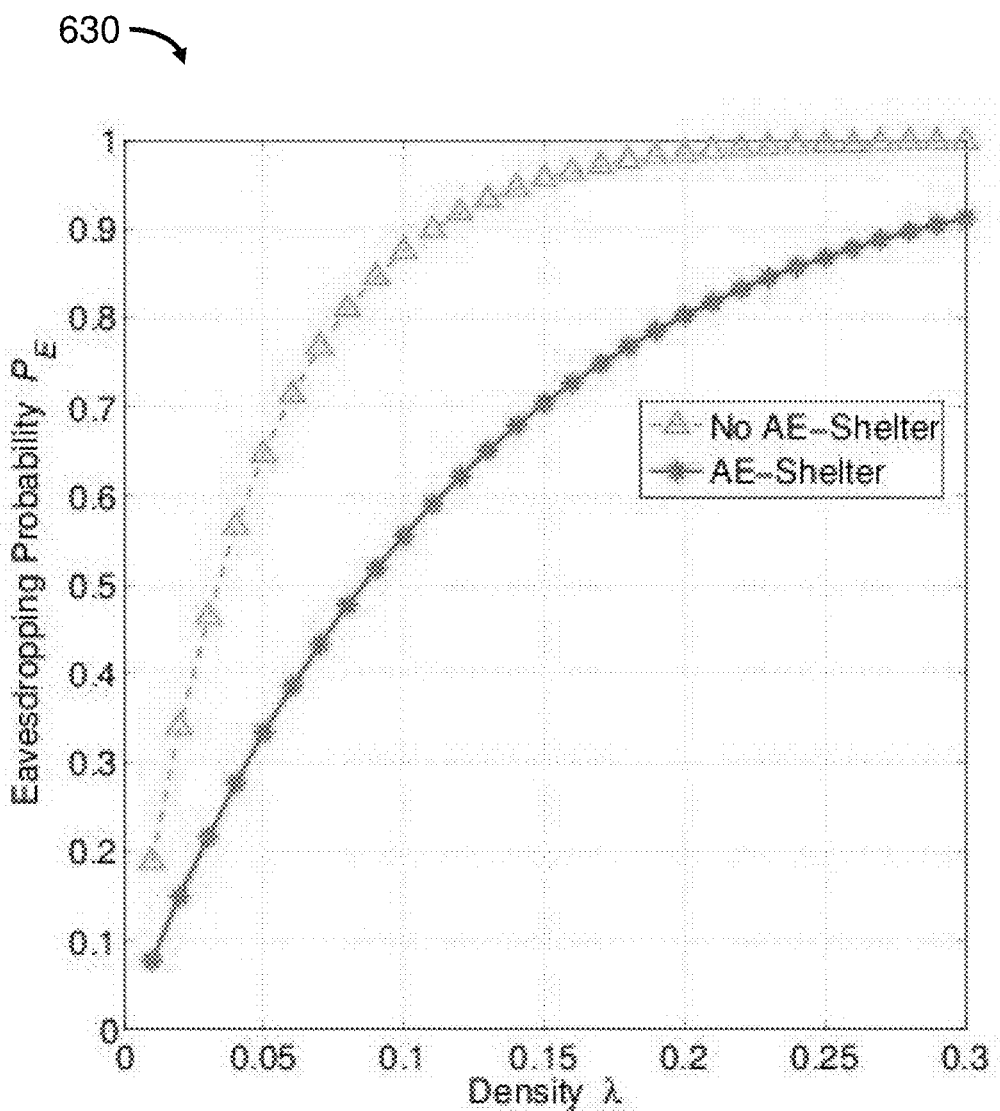
FIG. 6C shows the eavesdropping probability $P_E$ varies with the density of transmitters $\lambda$ when the path loss factor $\alpha$ is 3 and the transmitting power $P_t$ is 2 in No AE-shelter scheme and AE-shelter scheme in accordance with an example embodiment.
Figure 6D:
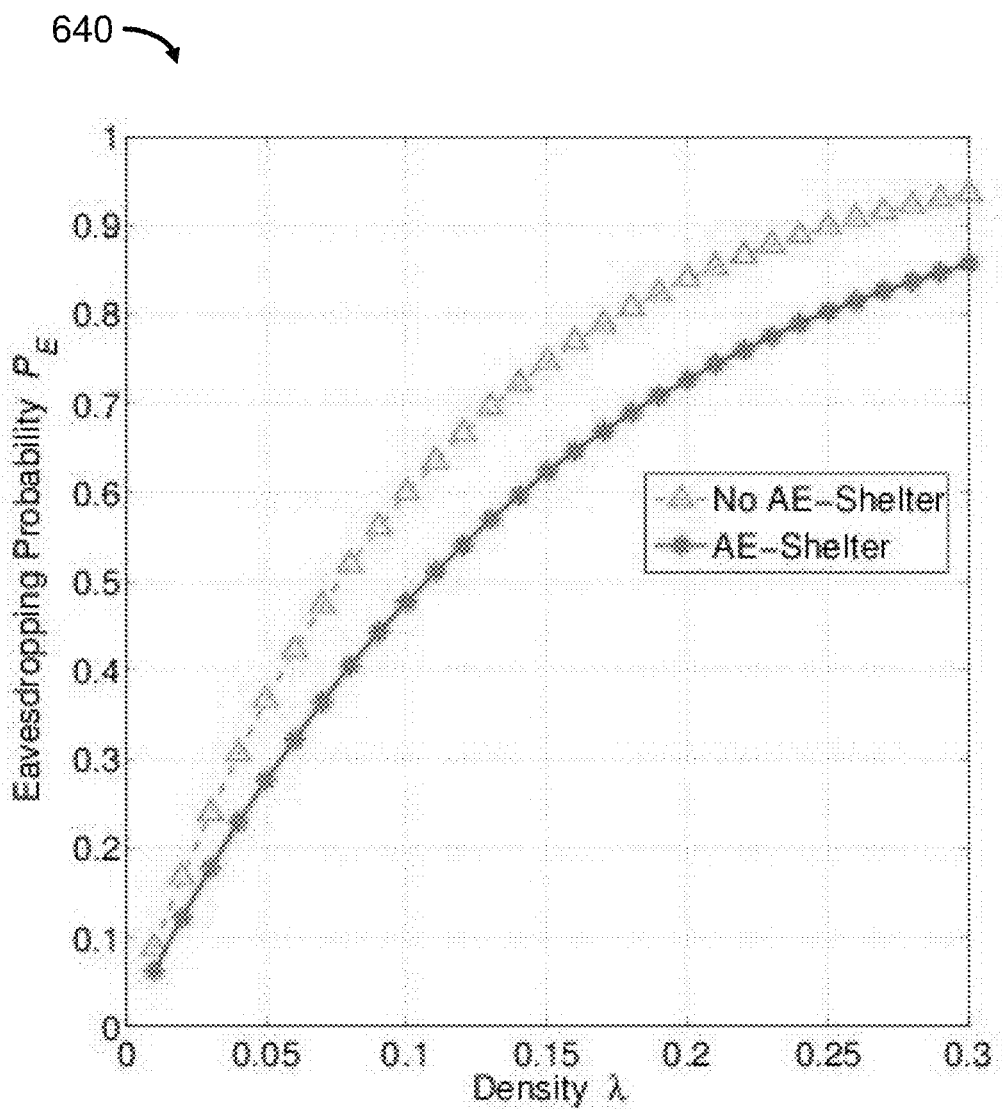
FIG. 6D shows the eavesdropping probability $P_E$ varies with the density of transmitters $\lambda$ when the path loss factor $\alpha$ is 4 and the transmitting power $P_t$ is 2 in No AE-shelter scheme and AE-shelter scheme in accordance with an example embodiment.

The effectiveness of the improved AE-shelter in terms of eavesdropping probability $P_E$ is investigated. FIGS. 6A, 6B, 6C and 6D show the eavesdropping probability $P_E$ when the density of transmitters $\lambda$ varies from 0.01 to 0.3 according to example embodiments. FIG. 6A shows the case when $\alpha$ is 3 and $P_t$ is 1. FIG. 6B shows the case when $\alpha$ is 4 and $P_t$ is 1. FIG. 6C shows the case when $\alpha$ is 3 and $P_t$ is 2. FIG. 6D shows the case when $\alpha$ is 4 and $P_t$ is 2. $P_t$ is the transmitting power of the legitimate transmitters. The AE-shelter scheme is compared with No AE-shelter scheme, i.e. no protection. It is shown that $P_E$ of No AE-shelter scheme is always higher than that of AE-shelter scheme in each group of analytical results. This implies that the improved AE-shelter is effective to mitigate the eavesdropping risk.

Also, it is shown that the eavesdropping probability $P_E$ is affected by the channel conditions, such as Rayleigh fading and path loss effect, in both AE-shelter scheme and No AE-shelter scheme. For example, when the path loss factor $\alpha$ is increasing from 3 to 4 with the same transmitting power $P_t$=1 (as shown in FIGS. 6A and 6B), the eavesdropping probability $P_E$ increases significantly in both AE-shelter scheme and No AE-shelter scheme. Moreover, tuning the transmitting power $P_t$ can also affect the eavesdropping probability $P_E$. When the transmitting power $P_t$ increases from 1 to 2 (as shown in FIGS. 6B and 6D), the eavesdropping probability $P_E$ increases. This is because the higher transmitting power $P_t$ indicates the higher SINR of legitimate communication resulting the higher risk of eavesdropping. This implies that the appropriate power control can also improve the security.

Figure 7A:
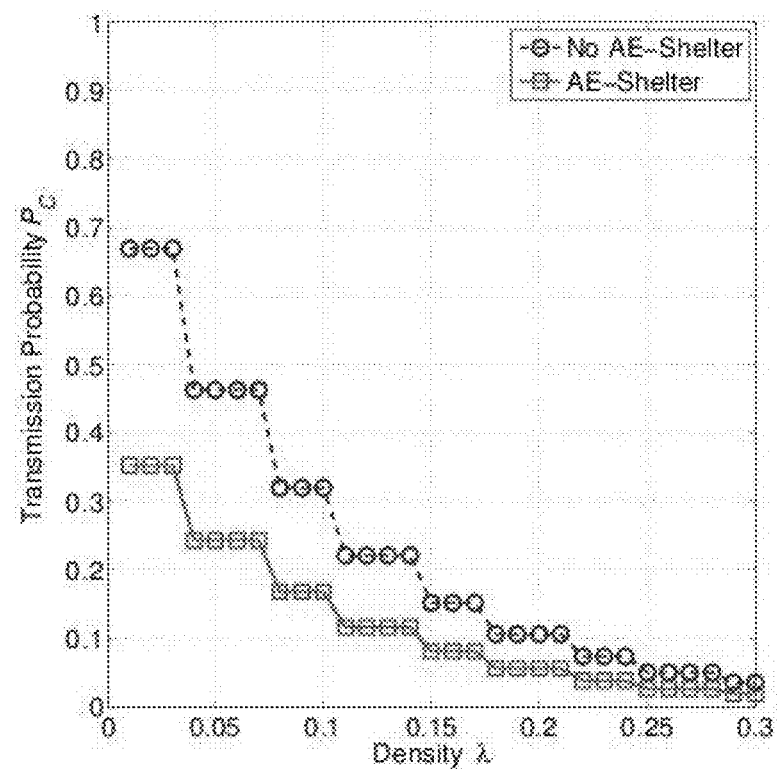
FIG. 7A shows the transmission probability $P_C$ varies with the density of transmitters $\lambda$ when the path loss factor $\alpha$ is 3 and the transmitting power $P_t$ is 1 in No AE-shelter scheme and AE-shelter scheme in accordance with an example embodiment.
Figure 7B:
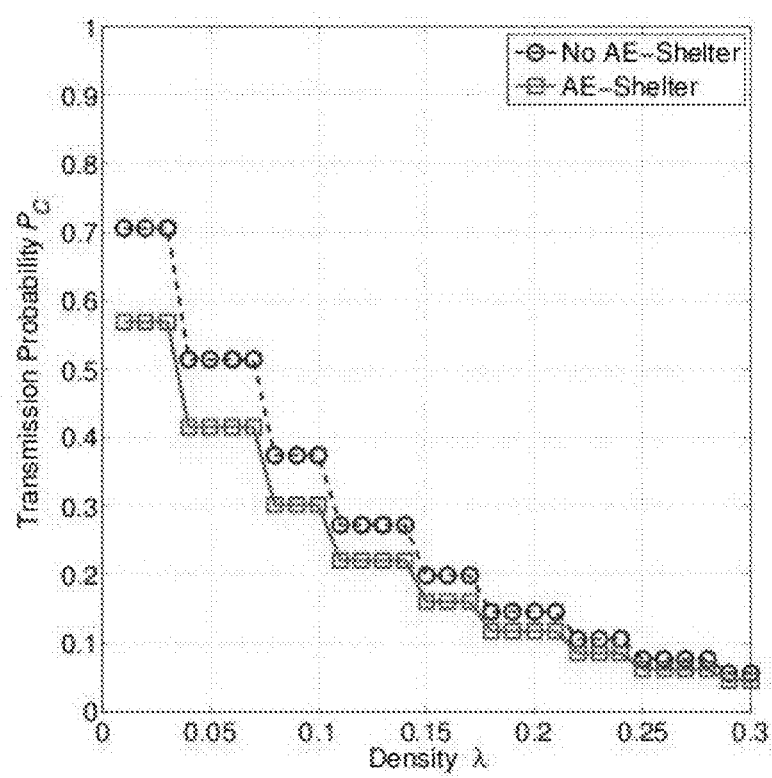
FIG. 7B shows the transmission probability $P_C$ varies with the density of transmitters $\lambda$ when the path loss factor $\alpha$ is 4 and the transmitting power $P_t$ is 1 in No AE-shelter scheme and AE-shelter scheme in accordance with an example embodiment.
Figure 7C:
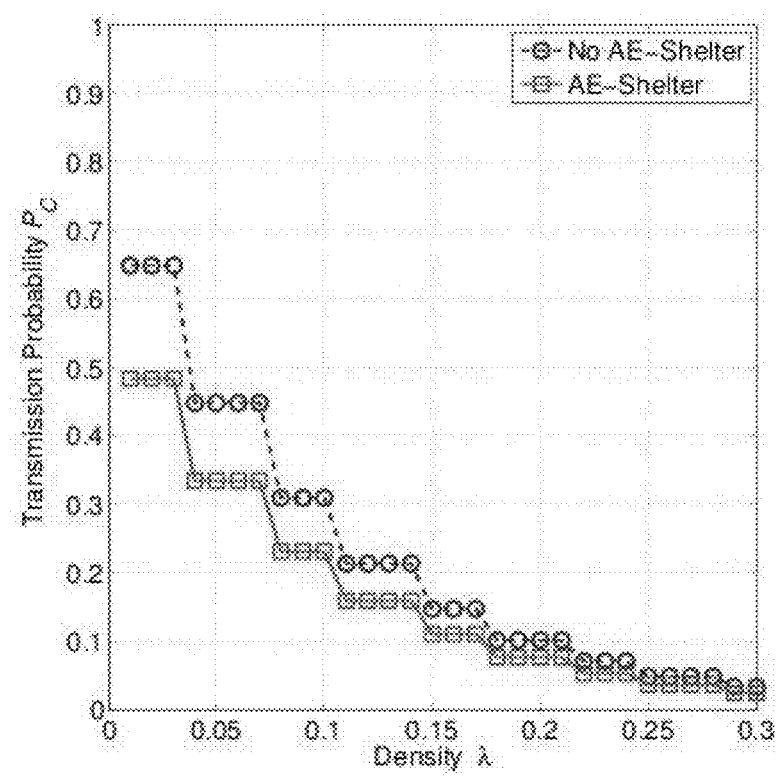
FIG. 7C shows the transmission probability $P_C$ varies with the density of transmitters $\lambda$ when the path loss factor $\alpha$ is 3 and the transmitting power $P_t$ is 2 in No AE-shelter scheme and AE-shelter scheme in accordance with an example embodiment.
Figure 7D:
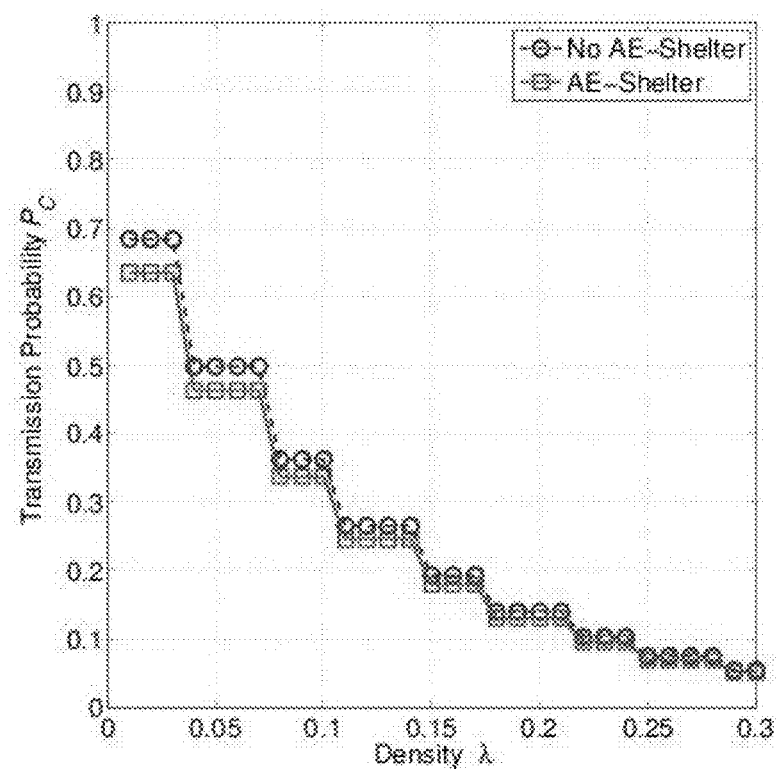
FIG. 7D shows the transmission probability $P_C$ varies with the density of transmitters $\lambda$ when the path loss factor $\alpha$ is 4 and the transmitting power $P_t$ is 2 in No AE-shelter scheme and AE-shelter scheme in accordance with an example embodiment.

The impacts of the improved AE-shelter in terms of transmission probability $P_C$ is investigated. FIGS. 7A, 7B, 7C and 7D show the transmission probability $P_C$ when the density of transmitters $\lambda$ varies from 0.01 to 0.3 according to example embodiments. FIG. 7A shows the case when $\alpha$ is 3 and $P_t$ is 1. FIG. 7B shows the case when $\alpha$ is 4 and $P_t$ is 1. FIG. 7C shows the case when $\alpha$ is 3 and $P_t$ is 2. FIG. 7D shows the case when $\alpha$ is 4 and $P_t$ is 2. $P_t$ is the transmitting power of the legitimate transmitters. The AE-shelter scheme is compared with No AE-shelter scheme, i.e. no protection. It is shown that $P_c$ of the AE-shelter scheme is just slightly lower than that of No AE-shelter scheme. This implies that the AE-shelter scheme has small impacts on legitimate communications. This effect is more noticeable when $\alpha$=4.

Similar to the eavesdropping probability, transmission probability $P_C$ is also affected by the channel conditions. For example, when the path loss factor $\alpha$ is increasing from 3 to 4 with the same transmitting power (as shown in FIG. 7C with FIG. 7D), the transmission probability $P_C$ increases in both AE-shelter scheme and no AE-shelter scheme. Besides, adjusting the transmitting power $P_t$ can also affect the transmission probability $P_C$. For example, when the transmitting power $P_t$ is increasing from 1 to 2 (as shown in FIGS. 7B and 7D), the transmission probability $P_C$ of AE-shelter scheme is also increasing. This is due to the fact that the higher transmitting power $P_t$ leads to the higher $SINR_C$ resulting the higher transmission probability.

Thus, the improved AE-shelter in one example embodiment can significantly decreases the eavesdropping risk compared with the No AE-shelter scheme and meanwhile maintains low decrement on the transmission probability.

Figure 8:
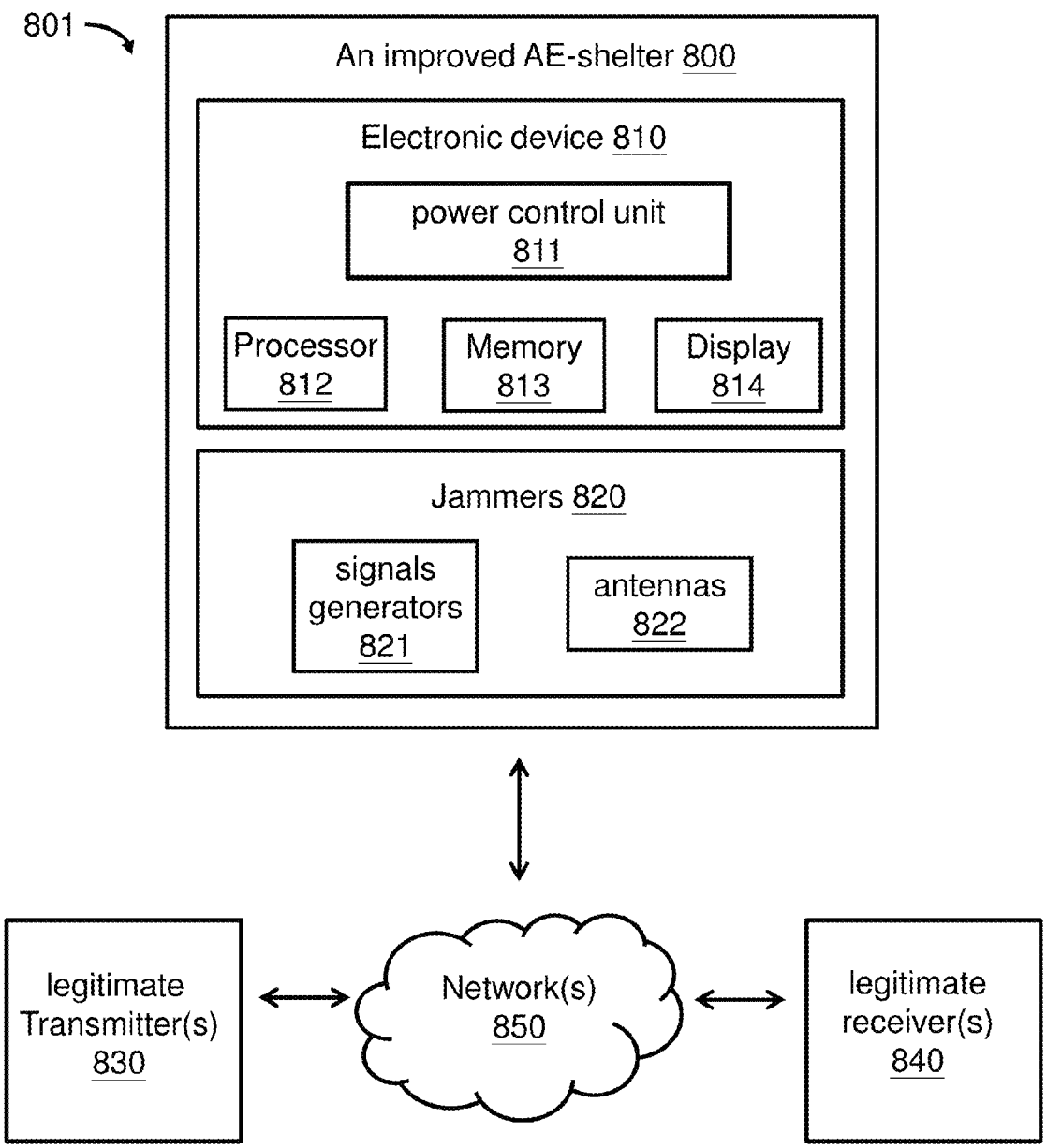
FIG. 8 shows an improved AE configuration includes an improved AE-shelter that generates wireless interference signals to protect wireless communication between legitimate transmitters and legitimate receivers in accordance with an example embodiment.

FIG. 8 shows an improved AE-shelter 800 that generates wireless interference signals to protect wireless communication between legitimate transmitters 830 and legitimate receivers 840 in one example embodiment. The shelter includes an electronic device 810 and a number of jammers 820.

The electronic device 810 includes a power control unit 811, a processor 812, a memory 813 and a display 814. Examples of an electronic device include, but are not limited to, laptop computers, desktop computers, tablet computers.

The power control unit 811 electrically connects to the jammers and tunes the emitting power of the jammers. The power control unit 811 can include software and/or specialized hardware to execute example embodiments.

The processor 812 includes a processor unit (such as a central processing unit, CPU, microprocessor, microcontrollers, field programmable gate array (FPGA), application-specific integrated circuit (ASIC), etc.) for controlling the overall operation of memory (such as random access memory (RAM) for temporary data storage, read only memory (ROM) for permanent data storage, and firmware). The processing unit execute jamming instructions of varying a frequency of the wireless interference signals, timing of the wireless interference signals, and symbols of the wireless interference signals and perform operations and tasks that implement one or more algorithms or equations discussed herein. The memory 813, for example, stores applications, data, programs, algorithms (including software to implement or assist in implementing example embodiments) and other data.

The jammers 820 are uniformly deployed in an improved geometrical structure including a circular boundary which surrounds the legitimate transmitters 830 and the legitimate receivers 840. Each jammer includes a signal generator to generate wireless interference signals and one or more antennas 822 to transmit interference signals.

The network(s) 850 include one or more of wireless network, such as cognitive radio networks, device-to-device networks, Internet of Things, etc.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

The methods in accordance with example embodiments are provided as examples, and examples from one method should not be construed to limit examples from another method. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

As used herein, the term "expectation" is a weighted average value of a random variable.

What is claimed is:

1. A method that improves an anti-eavesdropping (AE)-shelter that emits wireless interference signals that protect wireless communication between legitimate transmitters and legitimate receivers within the AE-shelter, the method comprising:
   determining a circular boundary for the AE-shelter;
   improving the AE-shelter by uniformly placing a number of jammers at the circular boundary with a jamming range $r_j$ for each jammer;
   tuning emitting power $P_j$ of the jammers so that power of interference signal at distance $r_j$ from the jammers is not lower than a predetermined threshold $T_j$ to enable jamming of the wireless communication; and
   improving a coverage area of the wireless interference signals such that the jamming range of one jammer does not overlap with the jamming range of another jammer and such that the jamming range of all of jammers covers an entirety of the circular boundary.

2. The method of claim 1 further comprising:
   calculating expectation $E(r_j)$ of $r_j$ by:

$$E(r_j) = \frac{1}{\alpha} \cdot \left(\frac{P_j}{\mu T_j}\right)^{\frac{1}{\alpha}} \cdot \Gamma\left(\frac{1}{\alpha}\right)$$

where $\alpha$ is path loss factor, $\mu$ is Rayleigh fading factor, $\Gamma$ denotes standard gamma function.

3. The method of claim 2, wherein the number of the jammers has a upper bound N,
   where N is bounded by $$\left\lceil \frac{2\pi}{2\theta} \right\rceil = \left\lceil \frac{\pi}{\theta} \right\rceil \quad \theta = \arcsin\left(\frac{E(r_j)}{R}\right)$$

and R is the radius of the circular boundary.

4. The method of claim 1 further comprising:
   emitting artificial noise from the jammers to prevent eavesdroppers located outside of the circular boundary of the AE-shelter from receiving readable signals generated by the legitimate transmitters located inside of the circular boundary of the AE-shelter.

5. The method of claim 1, wherein a signal-to-interference-noise ratio $SINR_C$ at the legitimate receivers located inside of the circular boundary of the AE-shelter is no less than $T_C$ which is a threshold of receiving power for a successful reception.

6. The method of claim 5, wherein $SINR_C$ is defined as:

$$\frac{P_t \cdot h_0 \cdot r^{-\alpha}}{\sigma^2 + I_t + I_j^c}$$

where $P_t$ is transmitting power of the legitimate transmitters, $h_0$ is Rayleigh factor, r is distance from the legitimate transmitters, $\sigma^2$ denotes Gaussian noise level, $I_t$ is cumulative interference power from the legitimate transmitters and $I_j^c$ is cumulative interference power from the jammers.

7. The method of claim 1 further comprising:
   transmitting jamming instructions to all of the jammers, wherein the jamming instructions include instructions of varying a frequency of the wireless interference signals, timing of the wireless interference signals, and symbols of the wireless interference signals.

8. An improved anti-eavesdropping (AE) shelter that generates wireless interference signals to protect wireless communication between legitimate transmitters and legitimate receivers, the improved AE-shelter comprising:
   an improved geometrical structure including a circular boundary and a number of jammers that are constructed with the wireless interference signals generators to generate the wireless interference signals, wherein the circular boundary surrounds the legitimate transmitters and the legitimate receivers, and the jammers are uniformly located at the circular boundary with jamming range $r_j$ for each jammer;
an improved coverage area of the wireless interference signals including a non-overlapped jamming range of the jammers that covers an entirety of the circular boundary; and
a power control unit that electrically connects to the jammers and tunes emitting power $P_J$ of the jammers so that power of the wireless interference signals at distance $r_j$ from the jammers is not lower than a predetermined threshold $T_j$ to enable jamming of the wireless communication.

9. The improved AE-shelter of claim 8, wherein expectation $E(r_j)$ of $r_j$ is calculated by:

$$E(r_j) = \frac{1}{\alpha} \cdot \left(\frac{P_j}{\mu T_j}\right)^{\frac{1}{\alpha}} \cdot \Gamma\left(\frac{1}{\alpha}\right)$$

where $\alpha$ is path loss factor, $\mu$ is Rayleigh fading factor, $\Gamma$ denotes standard gamma function.

10. The improved AE-shelter of claim 9, wherein the number of the jammers has a upper bound N,
where N is bounded by $$\left\lceil \frac{2\pi}{2\theta} \right\rceil = \left\lceil \frac{\pi}{\theta} \right\rceil \quad \theta = \arcsin\left(\frac{E(r_j)}{R}\right)$$

and R is the radius of the circular boundary.

11. The improved AE-shelter of claim 8, wherein the wireless interference signals are artificial noise that prevents eavesdroppers located outside of the circular boundary of the AE-shelter from receiving readable signals generated by the legitimate transmitters located inside of the circular boundary of the AE-shelter.

12. The improved AE-shelter of claim 8, wherein a signal-to-interference-noise ratio $SINR_c$ at the legitimate receivers is no less than $T_c$ which is a threshold of receiving power for a successful reception.

13. The improved AE-shelter of claim 12, wherein $SINR_c$ is defined as:

$$\frac{P_t \cdot h_0 \cdot r^{-\alpha}}{\sigma^2 + I_t + I_j^c};$$

where $P_t$ is transmitting power of the legitimate transmitters, $h_0$ is Rayleigh factor, r is distance from the legitimate transmitters, $\sigma^2$ denotes Gaussian noise level, $I_t$ is cumulative interference power from the legitimate transmitters and $I_j^c$ is cumulative interference power from the jammers.

14. The improved AE-shelter of claim 8 further comprising:
a processor; and
a non-transitory computer readable medium having stored therein instructions that the processor executes to transmit jamming instructions, wherein the jamming instructions include instructions of varying a frequency of the wireless interference signals, timing of the wireless interference signals, and symbols of the wireless interference signals.

15. A method that improves a configuration of a number of jammers that protectively jam wireless communication between legitimate transmitters and legitimate receivers, the method comprising:
determining a circular boundary that surrounds the legitimate transmitters and the legitimate receivers;
improving the implementation by uniformly placing the jammers at the circular boundary with jamming range $r_j$ for each jammer;
tuning emitting power $P_J$ of the jammers so that receiving power at a distance $r_j$ is not lower than a predetermined threshold $T_j$ to enable the jamming of wireless communication;
emitting wireless interference signals from the jammers; and
improving a coverage area of the wireless interference signals such that the jamming range of one jammer does not overlap with the jamming range of another jammer and such that the jamming range of all of jammers covers an entirety of the circular boundary.

16. The method of claim 15, further comprising:
calculating expectation $E(r_j)$ of $r_j$ by:

$$E(r_j) = E\left[\left(\frac{P_j \cdot h}{T_j}\right)^{\frac{1}{\alpha}}\right] = \frac{1}{\alpha} \cdot \left(\frac{P_j}{\mu T_j}\right)^{\frac{1}{\alpha}} \cdot \Gamma\left(\frac{1}{\alpha}\right)$$

where $\alpha$ is path loss factor, $\mu$ is Rayleigh fading factor, $\Gamma$ denotes standard gamma function, h is Rayleigh factor.

17. The method of claim 16, wherein the number of the jammers has a upper bound N,
where N is bounded by $$\left\lceil \frac{2\pi}{2\theta} \right\rceil = \left\lceil \frac{\pi}{\theta} \right\rceil \quad \theta = \arcsin\left(\frac{E(r_j)}{R}\right)$$

and R is the radius of the circular boundary.

18. The method of claim 15 further comprising:
emitting artificial noise from the jammers to prevent eavesdroppers located outside of the circular boundary from receiving readable signals generated by the legitimate transmitters located inside of the circular boundary.

19. The method of claim 15, wherein the legitimate receivers receive signal with a signal-to-interference-noise ratio $SINR_c$ no less than $T_c$ which is a threshold of receiving power for a successful reception.

20. The method of claim 19, wherein $SINR_c$ is defined as:

$$\frac{P_t \cdot h_0 \cdot r^{-\alpha}}{\sigma^2 + I_t + I_j^c}$$

where $P_t$ is transmitting power of the legitimate transmitters, $h_0$ is Rayleigh factor, r is distance from the legitimate transmitters, $\sigma^2$ denotes Gaussian noise level, $I_t$ is cumulative interference power from the legitimate transmitters and $I_j^c$ is cumulative interference power from the jammers.

* * * * *